United States Patent [19]

Florida et al.

[11] 4,148,415
[45] Apr. 10, 1979

[54] AUTOMATIC DISPENSING APPARATUS

[76] Inventors: Roy R. Florida, 201 N. Deerfield, Anaheim, Calif. 92807; Glen J. Connelly, 822 E. Alder, Brea, Calif. 92621

[21] Appl. No.: 862,557

[22] Filed: Dec. 20, 1977

Related U.S. Application Data

[63] Continuation of Ser. No. 693,294, Jun. 7, 1976, abandoned.

[51] Int. Cl.² ............................................ G01F 11/10
[52] U.S. Cl. ...................................... 222/76; 222/284
[58] Field of Search ..................... 222/33, 32, 37, 76, 222/284, 370, 345, 346, 347, 360

[56] References Cited

U.S. PATENT DOCUMENTS

| | | | |
|---|---|---|---|
| 534,361 | 2/1895 | Courtney | 222/346 |
| 1,639,370 | 8/1927 | Flegel | 222/345 |
| 3,554,406 | 11/1971 | Kleysteuber | 222/370 X |
| 3,894,657 | 7/1975 | Eckmayr | 222/370 X |
| 4,006,846 | 2/1977 | Coucher | 222/370 X |

Primary Examiner—John P. Shannon
Attorney, Agent, or Firm—James E. Brunton

[57] ABSTRACT

A fully automatic dispensing apparatus for dispensing predetermined measured of granular materials such as coffee, sugar, spices, and the like. The materials are stored in a sealed container and are dispensed therefrom by means of a unique dispensing and distribution system which ensures that each measure of material dispensed is substantially equal whether the storage container is full or nearly empty.

5 Claims, 8 Drawing Figures

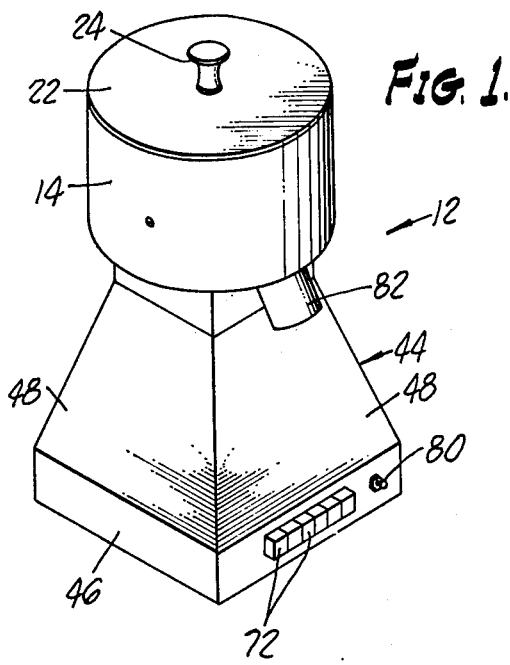
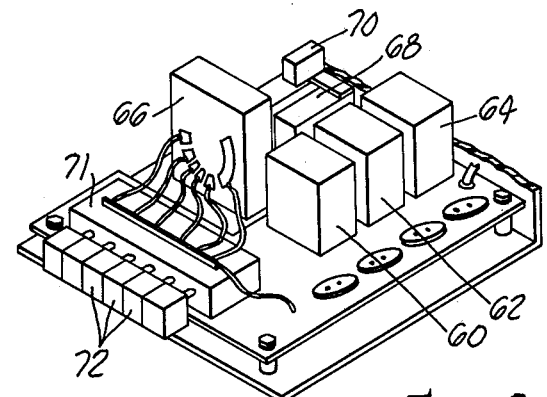
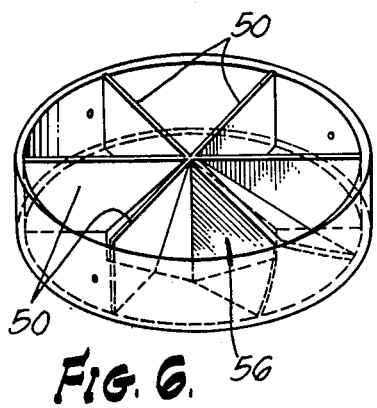
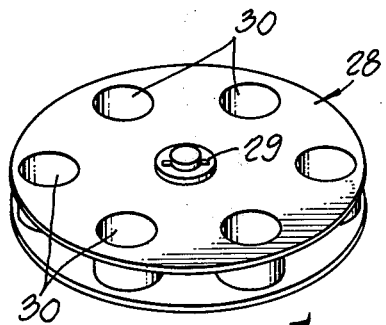
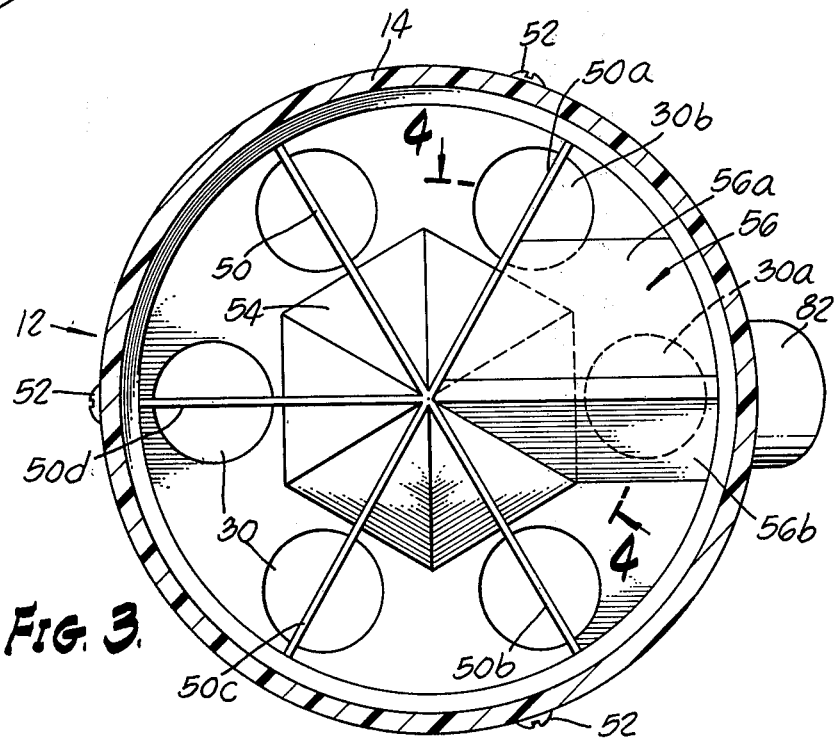

AUTOMATIC DISPENSING APPARATUS

BACKGROUND OF THE INVENTION

This is a continuing application of our co-pending application Ser. No. 693,294, filed June 7, 1976, abandoned.

FIELD OF THE INVENTION

This invention relates to material dispensing apparatus and more particularly to a fully automatic apparatus for dispensing predetermined measures of substances such as coffee, sugar, spices and similar granular materials.

DISCUSSION OF THE PRIOR ART

Several types of devices have been developed in the past for storing and dispensing materials such as sugar and the like. Typically, these devices comprise a storage receptacle from which the material is dispensed by gravity through an opening provided in the bottom of the container. Various types of feeding mechanisms are provided in the storage receptacle to feed the material toward the discharge opening, such as rotating partitioning members and the like. Almost without exception, however, the measure of material dispensed from the receptacle at any given time is dependent upon the amount of material remaining in the receptacle. Consequently, when the container is nearly empty, the measures of material dispensed may vary significantly in volume and frequently are smaller than the measures dispensed when the container is full. This is highly disadvantageous when a material such as coffee or sugar is being dispensed and precise and repeatedly consistent measures of the material is essential to the quality of the end product being prepared. For example, in brewing coffee it is critical that an accurate predetermined measure of ground coffee be used for each cup of coffee to be made. If "short" measures of coffee are dispensed as the storage receptacle is emptied, weak and inferior coffee will be produced.

As will become apparent from the description which follows, the apparatus of the present invention overcomes the deficiencies of the prior art devices. Because of the unique material dispensing and distribution system of the apparatus, each measure of material dispensed preceding the final measure is precisely determinable and highly uniform in volume. Therefore, the device can be used for dispensing materials such as coffee and the user can be assured that each measure dispensed will be of equal predetermined volume, even as the container empties.

SUMMARY OF THE INVENTION

It is an object of the present invention to provide a fully automatic apparatus for accurately dispensing preselected measures of granular materials such as coffee, sugar, tea, spices and similar commodities.

More particularly, it is an object of the invention to provide an apparatus of the aforementioned character in which, prior to being dispensed, the commodities are stored in a sealed container or receptacle and are automatically and accurately dispensed directly therefrom in a preselected quantity by simply pressing a button on the front of the unit indicating the desired number of measures to be dispensed.

It is another object of the invention to provide a dispensing apparatus of the type described in which each measure, with the possible exception of the last measure dispensed, is of precisely the same volume regardless of the amount of the commodity remaining in the storage container. In this way, even when the container is almost empty, the user can be assured that the measure then being dispensed is of exactly the same quantity as the measure dispensed when the container is full.

It is another object of the invention to provide an apparatus of the character described in which a single measure of known quantity of the commodity or preselected multiple measures thereof can be accurately and expeditiously dispensed at the option of the user.

It is still another object of the invention to provide an apparatus as described in the preceding paragraphs which is highly reliable, safe to use, and easy to clean and maintain.

It is a further object of the invention to provide an apparatus of the aforementioned type which is compact, attractive, and inexpensive to manufacture.

In summary, these and other objectives of the invention are realized by a material dispensing apparatus comprising a container having a discharge opening; a material dispensing mechanism rotatably mounted within the container relative to the discharge opening for sequentially dispensing predetermined measures of material from the container through the discharge opening; and distribution means mounted within the container for distributing the material and feeding it to the material dispensing mechanism so that each measure of material which is sequentially dispensed is substantially of equal volume without regard to the amount of material contained within the container during the dispensing operation.

BRIEF DESCRIPTION OF THE DRAWINGS

FIG. 1 is a perspective view of the material dispensing apparatus of the invention.

FIG. 3 is a view taken along lines 3—3 of FIG. 2 looking down on the distribution means and material dispensing means of the apparatus.

FIG. 6 is a perspective view further illustrating the configuration of the distribution means of the apparatus.

FIG. 7 is a perspective view further illustrating the construction of the dispensing means of the invention.

FIG. 8 is a perspective view illustrating in block form the various electrical components which comprise the control means of the invention.

DESCRIPTION OF THE PREFERRED EMBODIMENT

Figure 2:
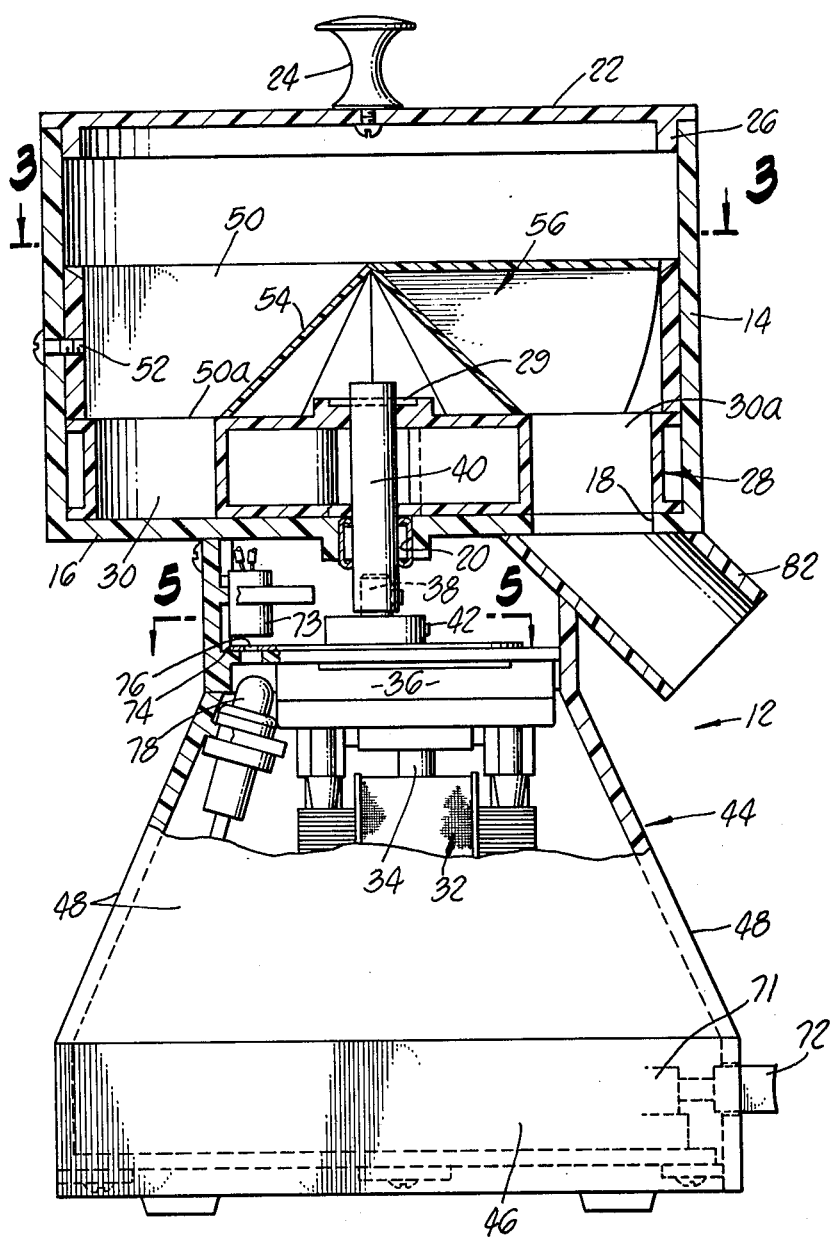
FIG. 2 is a greatly enlarged side elevational view of the apparatus drawn partly in cross-section to illustrate internal construction.

Referring to the drawings and particularly to FIGS. 1 and 2, the material dispensing apparatus of this embodiment of the invention, generally designated by the numeral 12, comprises a generally cylindrically shaped hollow container 14 for containing the material to be dispensed as, for example, coffee, sugar, tea, spices, and like granular materials. The bottom of container 14 is closed by a circular base plate 16 provided with a material distribution opening 18 and a central shaft opening 20. Closing the top of container 14 is a removable lid 22 having a handle 24 and a depending peripheral flange 26 adapted to be closely received within the top of container 14 so as to provide a tight seal against room atmosphere.

Rotatably mounted within container 14 proximate base plate 16 is a generally disc-shaped material dispensing member or wheel 28 which, in this embodiment comprises the material dispensing means of the invention. Wheel 28 is of a diameter only slightly smaller than the internal diameter of container 14 so that, as it is rotated, its outer periphery will remain in close proximity with the side walls of container 14, thereby preventing material within the container from entering the space between the wheel and side walls of the container.

As best seen by referring to FIG. 7, dispensing wheel 28 has formed therein a ring of spaced apart cylindrically shaped vertically extending tubes having bores 20 defining material measuring cavities or chambers. When wheel 28 is in place within container 14, as shown in FIG. 2, bores or measuring cavities 30 are in open communication with the material contained in the container and are centered about the central vertical axis of the container.

Figure 5:
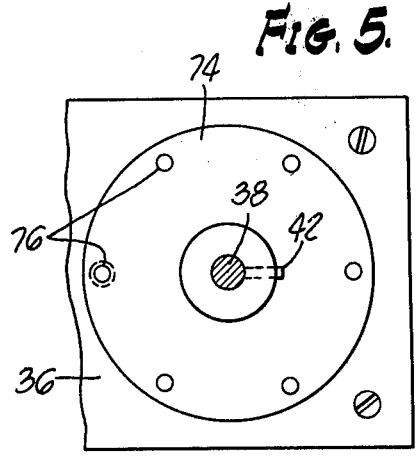
FIG. 5 is a view taken along lines 5—5 of FIG. 2 showing a portion of the drive means of the apparatus.

To rotate dispensing wheel 28 within container 14 there is provided an electric motor 32 which is mounted below container 14. Motor 32, which forms a part of the drive means of this embodiment, has a vertical drive shaft 34 and is operably connected to the dispensing wheel through a gear box 36 adapted to regulate the speed of rotation of the dispensing wheel. As best seen in FIG. 2, gear box 36 includes a drive shaft 38 which is drivably connected to a vertical shaft 40 by means of set screw 42 (FIG. 5). Shaft 40 is, in turn, drivably connected to dispensing wheel 28 by any suitable means such as transverse pin 29. Motor 32, as well as the various electrical components of the apparatus which comprise the control means of the invention presently to be described, are housed within a hollow container supporting stand 44 having a base portion 46 and inwardly sloping side walls 48.

Comprising an important part of the apparatus of the present invention is the material distribution means for controllably distributing the material within the container and feeding it to the material dispensing means. The unique design of the distribution means of the invention ensures that each measure of material dispensed from the apparatus is of substantially equal volume independently of the amount of the material contained within the container. The general configuration of the distribution means of this form of the invention is best illustrated in FIG. 6. Referring to FIG. 6, and also to FIGS. 2 and 3, the distribution means can be seen to comprise a plurality of vertical generally planar partitioning members 50 which extend radially outwardly from the central axis of container 14. As best seen in FIG. 2, the distribution means is held fixedly in position within container 14 by suitable means such as fasteners 52 which extend through the side walls of container 14. In the operating configuration of the apparatus, the distribution means is superimposed directly above wheel 28 and in close proximity therewith so that lower edges 50a of partitioning members 50 are in close proximity with the upper surface of dispensing wheel 28. Provided at the central portion of the distribution means is a generally pyramidal member 54 positioned to occupy the central space above shaft opening 20 formed in base plate 16. Member 54 serves to prevent material within the container from entering shaft opening 20 and also functions to guide the material within the container downwardly toward measuring cavities 30 formed in dispensing wheel 28.

Figure 4:
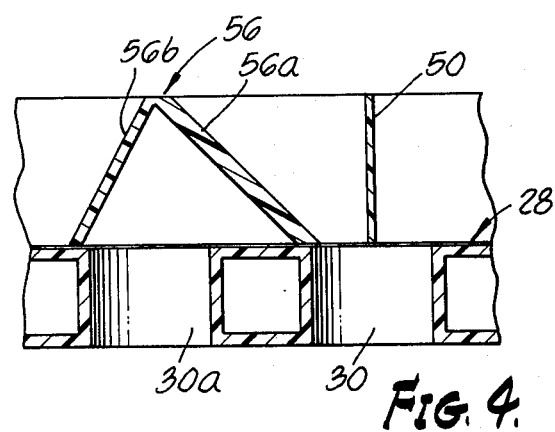
FIG. 4 is a view taken along lines 4—4 of FIG. 3 further illustrating the construction of the material dispensing means and distribution means of the apparatus.

Also forming a part of the distribution means of this form of the invention is a hood portion 56 superimposed above discharge opening 18 in base plate 16. As best seen in FIG. 4, hood portion 56 is generally triangular in cross-section comprising first and second sloping walls 56a and 56b. The lower edges of walls 56a and 56b are disposed in close proximity with the upper surface of dispensing wheel 28. With this construction, hood portion 56 functions to prevent material contained in container 14 from flowing directly out of the container through discharge opening 18 when one of the bores 30 in the dispensing wheel 28 is in alignment with the discharge opening (for example, bore 30a, FIG. 4).

In addition to electric motor 32, the drive means of this form of the present invention comprises a control means for intermittently energizing the motor to rotate dispensing wheel 28 in a manner as to sequentially index the measuring cavities 30 formed therein with discharge opening 18 formed in container 14.

Referring particularly to FIG. 8, the various electrical components which comprise the control means of the invention are shown generally in block form and comprise relay switches 60, 62 and 64 to activate, hold and deactivate the electrical system. Interconnected with the relay switches by appropriate electrical circuit means is a counting means provided here in the form of a ratchet relay 66 to cycle count. Coupled with the ratchet relay is a reset relay 68 to reset the ratchet relay at the end of the count. To activate reset relay 68, there is provided a switch 70. Also operably coupled with ratchet relay 66 and housed within base 46 of stand 44 is a selector means 71 comprising a bank of push button switches 72. As will be discussed in greater detail in the paragraphs which follow wherein the operation of the apparatus is described, selection of one of these push buttons determines the number of measures of material which will be dispensed. Also connected to ratchet relay 66 and forming a part of the control means of the invention is an energy detecting or light sensing and signalling means shown here as a photocell 73 (FIG. 2), the purpose and operation of which will also presently be discussed.

Each of the aforementioned electronic components are of a standard type, are readily commercially available and are interconnected in a conventional manner. Interconnection of the components to perform the functions hereinafter to be described is well within the skill of the art. Neither the components themselves nor the electrical circuitry involved in their interconnection forms any part of the present invention and will not, therefore, be described in detail. In point of fact, it is to be understood that rotation of the dispensing wheel of the apparatus need not be done by electrical means, but can be accomplished as well by a variety of mechanical means without departing from the scope of the present invention.

Also forming a part of the control means of the invention is a disc-shaped count plate 74 rotatably coupled with motor 32. Referring to FIGS. 2 and 5, it can be seen that count plate 74 is mounted within stand 44 immediately below photocell 73 and is provided with a ring of spaced apart apertures or vertical bores 76 centered about shaft 38 of gear box 36.

Disposed below count plate 74 in substantial vertical alignment with photocell 73 and forming a part of the control means is an energy source shown here as a light 78. Light 78 is positioned so that as plate 74 rotates causing apertures 76 therein to pass beneath the light sensing and signalling means or photocell 73, the latter will be energized and will transmit a signal to the counting means or ratchet relay 66 through the electrical circuit means.

Operation

With lid 22 removed, container 14 is filled with the material to be dispensed as, for example, ground coffee. As the container is filled, the material will flow substantially equally into the various compartments of the distribution means defined by the radially extending partitioning members 50. The material will also flow into and fill each of the measuring cavities 30 of the dispensing wheel of the apparatus with the exception of the cavity disposed below hood portion 56 (for example, cavity 30a as shown in FIG. 3).

When the container is filled, lid 22 is replaced and will form a tight seal against room atmosphere thereby preventing exposure of the material within the container to moisture and foreign matter. It is to be understood that during the entire operating cycle of the apparatus, the lid need not be removed, thereby ensuring the integrity of the material stored within the container.

Assuming for purposes of illustration the material being dispensed is ground coffee, the user will select the push button 72 located in the base of stand 44 having an indicia which corresponds to the number of cups of coffee to be made. For example, if it is desired to make four cups of coffee, the user would select and depress the push button exhibiting the indicia "4". Next, the user would activate the electrical system of the apparatus by depressing push button switch 80 which is located on the front of the apparatus adjacent the selector buttons 72. Activation of switch 80 energizes the relays of the control system and also energizes electric motor 32 so as to cause concomitant rotation of dispensing wheel 28 and count plate 74.

As dispensing wheel 28 rotates relative to the distribution means, the lower edges of the fixed partitioning members 50 tend to "top off" or level the coffee within the measuring cavities. By way of illustration, it can be seen by referring to FIG. 3 that as the dispensing wheel rotates in a clockwise direction and measuring cavity 30b moves beneath partitioning member 50a and hood wall 56a into indexing relation with discharge opening 18, the coffee will be scraped from the upper surface of the wheel so as to precisely fill or top off the measuring cavity. In this way, a repeatedly uniform amount of material will be dispensed as each measuring cavity is sequentially moved into the discharge position by rotation of the dispensing wheel 28.

As previously mentioned, energization of motor 32 causes dispensing wheel 28 and count plate 74 to commence rotation. Count plate 74 is arranged within the apparatus so that as one of the apertures 76 formed therein moves beneath photocell 73, permitting energization thereof by light source 78, one of the measuring cavities, such as cavity 30a of FIG. 3, will simultaneously move into alignment with discharge opening 18 formed in container 14. Upon energization of photocell 73, an activating signal is transmitted to ratchet relay 66, causing the relay to sequence one contact. As the measuring cavity moves into register with discharge opening 18, the ground coffee will, of course, fall by force of gravity from the cavity through the discharge opening 18 into an outwardly extending chute or passageway 82 adapted to direct the ground coffee into the coffee maker or other receptacle held beneath the chute. It is to be appreciated that because of the topping off process just described, the measure of material dispensed will be precisely equal to the volume of the measuring cavity. When coffee is being dispensed, therefore, the measuring cavity is designed to contain precisely the amount of ground coffee necessary to brew one cup of coffee.

Continued rotation of motor 32 drives the dispensing wheel 28 to a position wherein the next measuring cavity, for example cavity 30b of FIG. 3, is aligned with discharge opening 18. Once again, as the dispensing wheel rotates the ground coffee will be topped off from the measuring cavity so that the volume of coffee contained therein is precisely equal to the volume of the measuring cavity. Rotation of the dispensing wheel and the concomitant rotation of counting plate 74 will once again cause the next succeeding aperture 76 formed in count plate 74 to move beneath photocell 73 and into alignment with light source 78. Photocell 73 will once again be energized and will transmit an activating signal to ratchet relay 66 causing the relay to advance another step to the second contact. This process will be repeated until four of the measuring cavities have been moved into alignment with discharge opening 18 and the material contained therein has been discharged through chute 82. Upon the fourth activation of ratchet relay 66, i.e., where said relay has been stepped four times, switch 70, which is interconnected with said relay, will sense that the preset measure selected by depressing push button "4" has been reached. Switch 70 will then activate reset relay 68 which will return or re-set ratchet relay 66 to its starting position and simultaneously will turn off all electrical power to the apparatus. It is to be observed that when the system is deactivated, the last measuring cavity 28 from which the coffee has been dispensed will stop under hood portion 56. This assures that the material storage compartment remains sealed from room atmosphere.

When the user once again desires to operate the apparatus, he will depress the selector button 72 corresponding to the number of measures desired to be dispensed and depress switch 80 to electrically energize the control system of the apparatus. This will once again energize electric motor 32 and cause rotation of dispensing wheel 28 in the manner previously described until the number of measuring cavities corresponding with the indicia on the selector button depressed have moved into indexing alignment with the discharge opening. At such time, switch 70 will once again activate reset relay 68 to reset ratchet relay 66 and turn off all power to the unit.

As container 14 empties of material, it is to be appreciated that the chambers defined by partitions 50 which are furthest removed in a counter-clockwise direction from the leading edge of hood portion 56a (FIG. 3) will first be emptied. More specifically, by referring to FIG. 3, it can be seen that the chamber defined by partitioning web 50b and wall 56b of hood 56 will first be emptied of material as wheel 28 rotates in a clockwise direction. This is because material contained in this chamber will continuously be urged by partitioning member 50b into the measuring cavities 30 as they rotate beneath partitioning web 56. If the final measure of material remaining within the aforementioned chamber is insufficient to fill the measuring cavity rotating therebeneath, that cavity will be filled by material contained within the adjacent chamber defined by partitioning members 50b and 50c. When, in a similar manner, this latter chamber is emptied, material will be drawn from the next succeeding chamber defined by partitioning members 50c and 50d. This process will continue until all of the chambers are emptied with the exception of the chamber defined by partitioning member 50a and hood wall member 56a of hood 56. In all cases, however, it can be seen that as one chamber empties, material will be drawn from the next succeeding chamber so as to fill the measuring cavity 30 passing therebeneath. This arrangement assures that each measuring cavity prior to reaching a position of alignment with discharge opening 18 will be uniformly filled with material even though the container 14 may be substantially empty. When all of the material has been discharged from container 14, except the last quantity of material disposed within the chamber defined by partitioning member 50a and lead wall 56a of hood 56, the measuring cavities will be filled with the material remaining in this chamber and topped off by the lower edge of member 56a. This process will continue until the material in this chamber is exhausted. Only the last measuring chamber to move beneath wall 56a of hood 56, therefore, will contain less than a full measure of the material to be dispensed and, in this way, will alert the user that the apparatus must be refilled.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

We claim:
1. A coffee dispensing apparatus comprising:
 (a) a generally cylindrically shaped coffee container having a circular base plate provided with a coffee discharge opening and a central shaft opening therein;
 (b) a disc-shaped coffee dispensing wheel mounted for rotary movement within said container about the central axis thereof, said dispensing wheel having formed therein a ring of spaced apart cylindrically shaped vertically extending bores defining coffee measuring cavities in communication with coffee contained in said container and centered about said axis;
 (c) an electric motor mounted below said container and drivably coupled with said wheel;
 (d) control means for energizing said electric motor to rotate said wheel to sequentially index said bores with said discharge opening formed in said base plate; and
 (e) distribution means fixedly mounted within said container for controllably distributing the coffee to said coffee measuring cavities, said distribution means comprising:
  (1) a plurality of vertical, generally planar partitioning members superimposed above said wheel, said members extending radially outwardly from the central axis of the container and having their lower edges in close proximity with the upper surface of said wheel;
  (2) a generally pyramidal shaped member positioned to occupy the central space above said shaft opening in said base plate; and
  (3) a hood portion superimposed above said discharge opening in said base plate.
2. A coffee dispenser apparatus comprising:
 (a) a coffee container having a coffee storage portion and a discharge opening therein;
 (b) a coffee dispensing wheel mounted for rotary movement within said container about a centrally disposed vertical axis, said dispensing wheel having formed therein a ring of spaced apart measuring cavities centered about said axis; all but one of said cavities being at all times in open communication with said coffee storage portion;
 (c) drive means for rotating said coffee dispensing wheel to register said cavities sequentially with said discharge opening, said drive means comprising:
  (1) an electric motor drivably coupled with said dispensing wheel; and
  (2) control means for energizing said motor to rotate said dispensing wheel to sequentially index said measuring cavities formed therein with the discharge opening in said container, said control means comprising:
   (i) a disc-shaped count plate rotatably coupled with said motor, said plate having formed therein a ring of spaced apart vertical bores therethrough centered about said shaft;
   (ii) a light source disposed on one side of said count plate;
   (iii) a light sensing and signalling means disposed on the opposite side of said plate adapted to receive rays of light from said light source passing through the vertical bores formed in said plate;
   (iv) counting means operably interconnected with said light sensing and signalling means for counting signals received therefrom; and
   (v) electrical circuit means operatively connecting said electric motor and said counting means for deenergizing said motor when a preselected number of signals have been received by said counting means.
3. A material dispensing apparatus for dispensing granular materials such as coffee, sugar, spices and the like comprising:
 (a) a container for containing the material to be dispensed, said container having a discharge opening;
 (b) material dispensing means mounted for rotary movement within said container for dispensing predetermined measures of material from said container, said dispensing means having formed therein a plurality of material measuring cavities in communication with the material contained in said container;
 (c) drive means for rotating said material dispensing means;
 (d) control means for controlling said drive means to rotate said material dispensing means to sequentially index said cavities with said discharge opening; and
 (e) distribution means mounted within said container for controllably distributing the material therewithin to said measuring cavities, said distribution means comprising:

(1) a plurality of partitioning members superimposed above said dispensing means, said members extending radially outwardly from the central axis of said container and having their lower edges in close proximity with said dispensing means; and (2) a hood portion superimposed above said discharge opening in said container.

4. A material dispensing apparatus as defined in claim 3 in which said material dispensing means comprises a disc shaped dispensing wheel mounted for rotary movement within said container, said wheel having a plurality of spaced apart vertically extending measuring cavities; and in which said partitioning members comprise vertically extending, generally planar members having their lower edges in close proximity with the upper surface of said disc shaped dispensing wheel.

5. A material dispensing apparatus as defined in claim 3 in which said drive means comprises an electric motor mounted below said container and in which said control means comprises (a) a count plate rotatably coupled with said motor, said plate having formed therein a plurality of spaced apart bores therethrough;

(b) a light source disposed on one side of said count plate;

(c) a light sensing and signalling means disposed on the opposite side of said plate adapted to receive rays of light from said light source passing through the bores formed in said plate;

(d) counting means operably interconnected with said light sensing and signalling means for counting signals received therefrom; and (e) electrical circuit means operatively connecting said electric motor and said counting means for deenergizing said motor when a preselected number of signals have been received by said counting means.

* * * * *